E. S. AND R. C. HOGSHEAD.
TIRE CHAIN FASTENER.
APPLICATION FILED FEB. 11, 1922.
1,414,467.
Patented May 2, 1922.
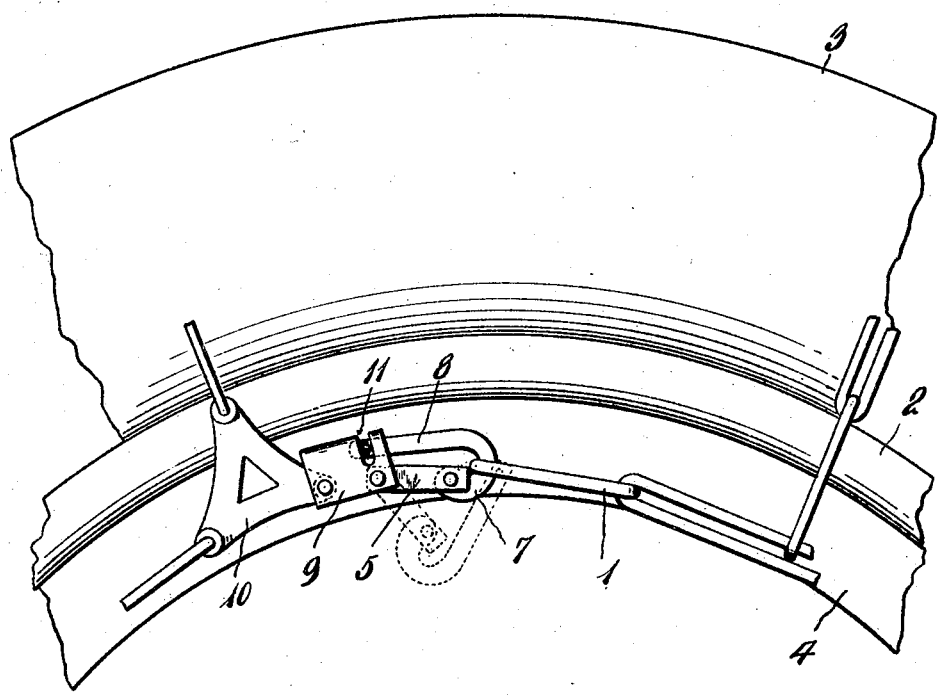
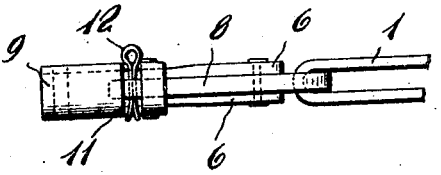
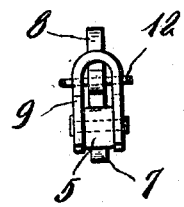
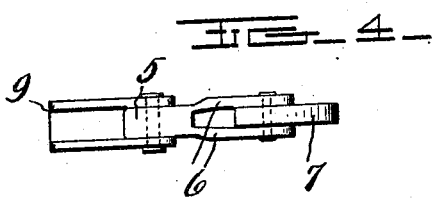
Inventors
E. S. Hogshead
and R. C. Hogshead
By Townshend & Townshend
Attorneys

UNITED STATES PATENT OFFICE.

EDGAR S. HOGSHEAD, OF MOUNT SOLON, AND RODNEY C. HOGSHEAD, OF GORDONSVILLE, VIRGINIA.

TIRE-CHAIN FASTENER.

1,414,467.     Specification of Letters Patent.     Patented May 2, 1922.

Application filed February 11, 1922. Serial No. 535,793.

*To all whom it may concern:*

Be it known that we, EDGAR S. HOGSHEAD and RODNEY C. HOGSHEAD, citizens of the United States, residing at Mount Solon, in the county of Augusta, and Gordonsville, county of Orange, respectively, State of Virginia, have invented certain new and useful Improvements in a Tire-Chain Fastener, of which the following is a specification.

Our invention relates to tire chains and has particular reference to improved fastening means adapted to be used in connection with such chains, the primary object thereof being the provision of an improved fastener which is easily applied, efficient in operation, and positive in effect.

Another object of the invention is to provide an improved fastener in which the tightening of the chain to which the same is applied will serve to maintain the fastener closed against accidental opening.

With these and such other objects in view as will be apparent from the description, my invention resides in the novel combination, construction, and arrangement of parts hereinafter described and claimed, and taken in connection with the accompanying drawings, of which—

Figure 1 is an elevation of the fastener as applied to a tire chain, with dotted lines showing the same in open position;

Figure 2, a top plan view thereof;

Figure 3, an end elevation; and

Figure 4, a bottom plan of the fastener.

In Figure 1, the fastener is shown as applied to a tire chain consisting of side links 1, and cross chains 2, disposed on a tire 3 mounted on the wheel 4. In detail the fastener comprises a metal base 5, substantially rectangular in cross section, and provided at one end with forked arms 6 between which is pivoted a lever 7, provided with a handle 8 curved sufficiently to extend when in closed position entirely over the top of the base 5, and spaced therefrom sufficiently to allow the reception of a chain link within the fastener, as illustrated clearly in Figure 1.

Pivoted on the opposite end of the base 5 is a U-shaped guard member 9 straddling the base and pivoted at the lower end of the guard. Between the arms of the guard member at the lower opposite end is pivoted a chain member 10, and the guard member is provided with a slot 11, above its pivotal connection with the base member, whereby a cotter key 12 may be passed through a perforation in the handle 8 when the same is disposed within the guard member.

In assembly, the fastener is in the position as shown in dotted lines in Figure 1, and the chain link 1 is passed over the end of handle 8 after which same is turned so as to dispose the end of the handle within the guard member 9, which is moved on its pivotal connection sufficiently to permit this arrangement, and the cotter key 12 is then inserted as described, which provides an effectual lock against displacement of the handle. In use, as the chain is tautened, the pull will be exerted on opposite ends of the fastener and due to the pivotal connection described the guard 9 will be forced inwardly over the end of the handle to effectively retain the handle in locked position, irrespective of the cotter key which is used as a further means of assuring a positive locked relation.

While we have described and illustrated certain details and materials which enter into the construction and arrangement of our invention, we desire it to be understood that we do not intend to limit ourselves to these, but that any such may be used as will fall within the scope of the invention as claimed.

We claim:

1. A fastener of the character described, comprising a base, a handle pivoted to one end of said base, and a guard pivoted to the opposite end of said base and adapted to be moved over said handle to retain same in locked position, and cooperating locking means on said handle and guard.

2. A fastener comprising a base, a handle pivoted to one end of said base, a guard pivoted to the opposite end of said base and adapted to be swung over said handle to retain same in locked position, said guard being provided with a slot, and a cotter key adapted to be passed through said slot and handle to retain same in locked position.

3. A fastener comprising a base, forked arms extending from one end thereof, a curved handle lever pivoted between said arms and adapted to extend over said base in spaced relation to receive a tire chain link, a guard pivoted on the opposite end of said base, and permanently connected with one end of a tire chain, said guard being adapted to receive the end of the handle lever to retain same in locked position, and a guard engaging member on said handle.

4. A fastener comprising a base, a handle lever pivoted at one end thereof, and adapted to receive thereover a tire chain link, a substantially U-shaped guard member pivoted to the opposite end of said base, and carrying one end of a tire chain, said handle being adapted to be received between the walls of said guard member whereby said handle is retained in locked position.

5. A fastener comprising a base, a handle lever pivoted on one end of said base and adapted to extend thereover in spaced relation for the reception of a tire chain link from the free end of the handle, a substantially U-shaped guard member pivoted at one end to the opposite end of said base, said guard member being pivotally connected to the tire chain, said handle being adapted to be received in said guard member to retain the fastener in locked position, said guard member being provided with a slot, and a cotter key adapted to be positioned through said slot and handle lever to retain same in locked position.

In testimony whereof we affix our signatures.

EDGAR S. HOGSHEAD.
RODNEY C. HOGSHEAD.